(12) United States Patent
Mattsson

(10) Patent No.: US 9,971,906 B2
(45) Date of Patent: May 15, 2018

(54) APPARATUS AND METHOD FOR CONTINUOUS DATA PROTECTION IN A DISTRIBUTED COMPUTING NETWORK

(71) Applicant: Protegrity Corporation, George Town, Grand Cayman (KY)

(72) Inventor: Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days. days.

(21) Appl. No.: 14/720,303

(22) Filed: May 22, 2015

(65) Prior Publication Data

US 2015/0278536 A1 Oct. 1, 2015

Related U.S. Application Data

(63) Continuation of application No. 11/904,684, filed on Sep. 27, 2007, now abandoned.

(60) Provisional application No. 60/848,251, filed on Sep. 29, 2006.

(51) Int. Cl.
| | |
|---|---|
| H04L 29/06 | (2006.01) |
| G06F 21/62 | (2013.01) |
| H04L 9/06 | (2006.01) |
| H04L 9/32 | (2006.01) |
| G06F 12/14 | (2006.01) |
| G06F 21/60 | (2013.01) |

(52) U.S. Cl.
CPC ...... *G06F 21/6227* (2013.01); *G06F 12/1408* (2013.01); *G06F 21/602* (2013.01); *G06F 21/6209* (2013.01); *G06F 21/6245* (2013.01); *H04L 9/0637* (2013.01); *H04L 9/3236* (2013.01); *H04L 63/0464* (2013.01); *H04L 2209/56* (2013.01)

(58) Field of Classification Search
USPC ......................................... 726/26
See application file for complete search history.

(56) References Cited

U.S. PATENT DOCUMENTS

| | | |
|---|---|---|
| 4,827,508 A | 5/1989 | Shear |
| 6,122,378 A | 9/2000 | Yoshiura et al. |
| 6,154,542 A | 11/2000 | Crandall |

(Continued)

FOREIGN PATENT DOCUMENTS

| | | |
|---|---|---|
| EP | 1209550 A2 | 5/2002 |
| JP | 2000 267940 A | 9/2000 |
| WO | WO 00/05642 A1 | 2/2000 |

OTHER PUBLICATIONS

European Extended Search Report, European Application No. 07117668.9, dated Jun. 18, 2014, 10 pages.

(Continued)

*Primary Examiner* — Harris C Wang
(74) *Attorney, Agent, or Firm* — Fenwick & West LLP

(57) ABSTRACT

A system for secure data storage and transmission is provided. The system comprises a first security module for protecting data in a first data at rest system and a second security module for protecting data in a second data at rest system. At least one encryption parameter for the second data at rest system differs from at least one encryption parameter for the first data at rest system so that a datum is reencrypted when the datum is transferred from the first data at rest system to the second data at rest system.

21 Claims, 15 Drawing Sheets

(56) References Cited

U.S. PATENT DOCUMENTS

| | | | |
|---|---|---|---|
| 6,249,866 B1 | 6/2001 | Brundrett et al. | |
| 6,418,421 B1 | 7/2002 | Hurtado et al. | |
| 6,671,687 B1 | 12/2003 | Pederson et al. | |
| 6,886,102 B1 | 4/2005 | Lyle | |
| 6,957,330 B1 | 10/2005 | Hughes | |
| 7,085,927 B1* | 8/2006 | Kohli | G06F 21/6218 713/164 |
| 7,111,005 B1 | 9/2006 | Wessman | |
| 7,149,722 B1 | 12/2006 | Abburi | |
| 7,212,635 B2 | 5/2007 | Nishikawa | |
| 7,221,756 B2 | 5/2007 | Patel et al. | |
| 7,222,231 B2 | 5/2007 | Russell et al. | |
| 7,269,564 B1 | 9/2007 | Milsted et al. | |
| 7,376,680 B1 | 5/2008 | Kettler et al. | |
| 7,418,098 B1 | 8/2008 | Mattsson et al. | |
| 7,428,636 B1 | 9/2008 | Waldspurger et al. | |
| 7,475,242 B2* | 1/2009 | Baird | G06F 21/6218 713/166 |
| 7,484,092 B2 | 1/2009 | Rajasekaran et al. | |
| 7,536,549 B2 | 5/2009 | Ishizaki et al. | |
| 7,536,558 B2 | 5/2009 | Neble et al. | |
| 7,558,968 B2 | 7/2009 | Sakaguchi | |
| 7,669,225 B2 | 2/2010 | Peled et al. | |
| 7,689,547 B2 | 3/2010 | Cristofor et al. | |
| 7,814,316 B1 | 10/2010 | Hughes et al. | |
| 7,864,952 B2 | 1/2011 | Pauker et al. | |
| 7,890,459 B1 | 2/2011 | Linstead | |
| 7,934,105 B1 | 4/2011 | Buckingham | |
| 8,045,714 B2 | 10/2011 | Cross et al. | |
| 8,135,948 B2 | 3/2012 | Shulman et al. | |
| 8,826,370 B2* | 9/2014 | Boukobza | G06F 21/6227 726/1 |
| 2002/0112167 A1* | 8/2002 | Boneh | H04L 63/0428 713/182 |
| 2002/0174355 A1 | 11/2002 | Rajasekaran et al. | |
| 2003/0016821 A1 | 1/2003 | Hammersmith | |
| 2003/0026429 A1 | 2/2003 | Hammersmith | |
| 2003/0026431 A1 | 2/2003 | Hammersmith | |
| 2003/0084290 A1* | 5/2003 | Murty | H04L 63/0428 713/168 |
| 2003/0084339 A1* | 5/2003 | Roginsky | G06F 21/6245 726/4 |
| 2003/0091186 A1 | 5/2003 | Fontijn et al. | |
| 2003/0215092 A1* | 11/2003 | Dick | G06F 21/6245 380/246 |
| 2004/0003251 A1 | 1/2004 | Narin et al. | |
| 2004/0022390 A1 | 2/2004 | McDonald et al. | |
| 2004/0255133 A1 | 12/2004 | Lei et al. | |
| 2005/0169473 A1 | 8/2005 | Candelore | |
| 2005/0190920 A1 | 9/2005 | Ahonen | |
| 2006/0002559 A1 | 1/2006 | Kachi | |
| 2006/0047977 A1 | 3/2006 | Hanasaki | |
| 2006/0080553 A1 | 4/2006 | Hall | |
| 2006/0206923 A1* | 9/2006 | Thompson | H04L 63/0428 726/4 |
| 2006/0218647 A1 | 9/2006 | Hars et al. | |
| 2006/0265330 A1 | 11/2006 | Fukasawa | |
| 2007/0055891 A1 | 3/2007 | Plotkin et al. | |
| 2007/0074047 A1 | 3/2007 | Metzger et al. | |
| 2007/0079117 A1* | 4/2007 | Bhogal | H04L 9/00 713/160 |
| 2007/0079119 A1 | 4/2007 | Mattsson et al. | |
| 2007/0083467 A1 | 4/2007 | Lindahl et al. | |
| 2007/0083928 A1 | 4/2007 | Mattsson et al. | |
| 2008/0066144 A1 | 3/2008 | Greco et al. | |
| 2008/0082837 A1* | 4/2008 | Mattsson | G06F 21/6209 713/193 |
| 2010/0074441 A1* | 3/2010 | Pauker | H04L 9/0625 380/45 |
| 2013/0266139 A1* | 10/2013 | Abl | H04L 63/0428 380/255 |

OTHER PUBLICATIONS

European Partial Search Report, European Application No. 07117668.9, dated Mar. 3, 2014, 7 pages.

European Extended Search Report, European Application No. 07117665.5, dated Oct. 1, 2012, 6 pages.

Mattsson, U.T., "A Practical Implementation of Transparent Encryption and Separation of Duties in Enterprise Databases: Protection Against External and Internal Attacks on Databases," Seventh IEEE International Conference on E-commerce Technoloav, Jul. 19, 2005, pp. 559-565.

United States Office Action, U.S. Appl. No. 11/904,684, dated Jan. 22, 2015, 19 pages.

United States Office Action, U.S. Appl. No. 11/904,684, dated Aug. 28, 2014, 24 pages.

United States Office Action, U.S. Appl. No. 11/904,684, dated Feb. 13, 2014, 23 pages.

United States Office Action, U.S. Appl. No. 11/904,684, dated Jul. 25, 2013, 14 pages.

United States Office Action, U.S. Appl. No. 11/904,684, dated Aug. 26, 2011, 10 pages.

United States Office Action, U.S. Appl. No. 11/904,684, dated Feb. 17, 2011, 10 pages.

Mitchell, S., "Encrypting Sensitive Data in a Database," Published Aug. 17, 2005, [Online] [Retrieved on Apr. 27, 2015] Retrieved from the Internet<URL:http://www.4guysfromrolla.com/articles/081705-1.aspx>.

Prakruti, C. et al., "Efficient Format Preserving Encrypted Databases," Mar. 7, 2015, 4 pages.

Brightwell, M., "Using Datatype-Preserving Encryption to Enhance Data Warehouse Security," 20th NISSC Proceedings, 1997, pp. 141-149.

Black, J. et al., "Ciphers with Arbitrary Finite Domains," 2002, pp. 114-130.

United States Office Action, U.S. Appl. No. 11/904,791, dated Feb. 18, 2011, 13 pages.

United States Office Action, U.S. Appl. No. 11/904,791, dated Nov. 8, 2011, 13 pages.

United States Office Action, U.S. Appl. No. 11/904,791, dated Dec. 21, 2012, 11 pages.

United States Office Action, U.S. Appl. No. 11/904,791, dated Jul. 16, 2013, 13 pages.

European Examination Report, European Application No. 07117668.9, dated May 19, 2016, 3 pages.

European Examination Report, European Application No. 07117668.9, dated Mar. 28, 2017, 5 pages.

* cited by examiner

APPARATUS AND METHOD FOR CONTINUOUS DATA PROTECTION IN A DISTRIBUTED COMPUTING NETWORK

CROSS-REFERENCE TO RELATED APPLICATIONS

This application is a continuation of U.S. patent application Ser. No. 11/904,684, filed Sep. 27, 2007, now abandoned, which claims priority to U.S. Provisional Patent Application 60/848,251, filed Sep. 29, 2006, which are incorporated by reference in their entirety.

TECHNICAL FIELD

The subject disclosure relates to methods and systems for protecting sensitive electronic information, and more particularly to improved methods and systems for protecting credit card information as such information is processed, stored, and travels across a distributed computing network.

BACKGROUND INFORMATION

As the world of telecommunications, computer networking, and electronics continues to expand, the world as we know provides unprecedented access to information. Sitting in the glow of a computer screen, an individual can instantaneously access information on the opposite side of the planet by the Internet and other means. As companies continue to integrate such capabilities into more and more facets of their business, new and difficult challenges arise. In general, those with access to information are trustworthy and would never consider accessing and/or using information improperly. However, in the area of electronic commerce, credit card fraud and identity theft have become commonplace.

Such problems have spurred advances in the technology of securing data. Examples of such advances are the commonly-used secure sockets layer (SSL) and S-HTTP security mechanisms. Whereas SSL utilizes handshake-based key distribution with complex public key cryptography techniques, S-HTTP is designed to send individual messages securely. In either case, intermediaries in the process are not able to do more than simply move the incoming file to a subsequent destination, even though the intermediary is an integral part of the ongoing client-server relationship. Hence, the very nature of the security mechanisms presents limitations in that in order for an intermediary to have access, the access criteria must be duplicated in a complex and difficult to maintain manner.

Despite these advances, sensitive information is still commonly stolen and illicitly used. One area of weakness is the time when data is in transit and, particularly, in transit within a single entity or enterprise such as on an internal network. Similarly, as data passes between organizations, the data can be exposed by weak security measures and other infiltrations such as access data stolen from authorized personnel.

SUMMARY OF THE INVENTION

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

One embodiment of the invention is directed to a system for secure data storage and transmission comprising a first security module for protecting data in a first data at rest system and a second security module for protecting data in a second data at rest system. At least a subset of data stored in the first data at rest system is encrypted. The first security module is associated with a first key domain defining encryption parameters for the first data at rest system. At least a subset of data stored in the second data at rest system is encrypted. The second security module is associated with a second key domain defining encryption parameters for the second data at rest system. At least one encryption parameter for the second data at rest system differs from at least one encryption parameter for the first data at rest system so that a datum is reencrypted when the datum is transferred from the first data at rest system to the second data at rest system.

This embodiment may have several features. For example, encryption parameters may comprise encryption keys or encryption algorithms. The first security module may encrypt data stored on the first data at rest system. The second security module may encrypt data stored on the second data at rest system.

The system may also include a security management module which promulgates a security policy. The security management module may be communicatively coupled with the first security module and the second security module. The security management module may store an audit log. In some embodiments, encryption parameters in the first key domain may be altered independently of encryption parameters in the second key domain.

Another embodiment of the invention is directed to a selective data access system comprising a first data field encrypted with a first encryption key and a second data field encrypted with a second encryption key. A first user has access to the first encryption key and a second user has access to a second encryption key.

This embodiment may have several features. In some embodiments, a third user has access to both the first and the second encryption keys. The first data field and the second data field may reside in the same database. The first data field and the second data field may reside in the same table.

Another embodiment of the invention is directed to a method of data transfer comprising storing data and encryption status information for the data in a first data at rest system, examining the encryption status information when transferring the data from the first data at rest system to a second data at rest system, and reencrypting the data if the first data at rest system and the second data at rest system are associated with different key domains. In some embodiments, the key domains define encryption parameters. In other embodiments, encryption parameters comprise encryption keys or encryption algorithms.

Another embodiment of the invention is directed to a method for providing partial access to data comprising generating a report for a third party, the report containing obfuscated sensitive information, allowing the third party to examine the report, and providing access to unobfuscated sensitive information if the third party identifies information of interest.

This embodiment of the invention can have various features. For example, the obfuscated sensitive information may be pronouncable. The method may include generating a report comprises obtaining obfuscated data from a substitution cipher. The obfuscated sensitive data may be of the same data category as the unobfuscated sensitive data. The report may include obfuscated sensitive data selected from the group consisting of names, social security numbers, indications of treatment, telephone numbers and combinations thereof.

Another embodiment of the invention is directed to a method of secure data transport comprising encrypting a datum, storing the datum in a first data at rest system, and transferring the datum to a second data at rest system. The datum remains encrypted during transfer and storage.

This embodiment of the invention can have various features. The first data at rest system can be associated with a first domain and the second data at rest system can be associated with a second domain. The datum may be encrypted in accordance with the second domain before transfer. The datum may be encrypted in accordance with the second domain after transfer.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

Figure 1:
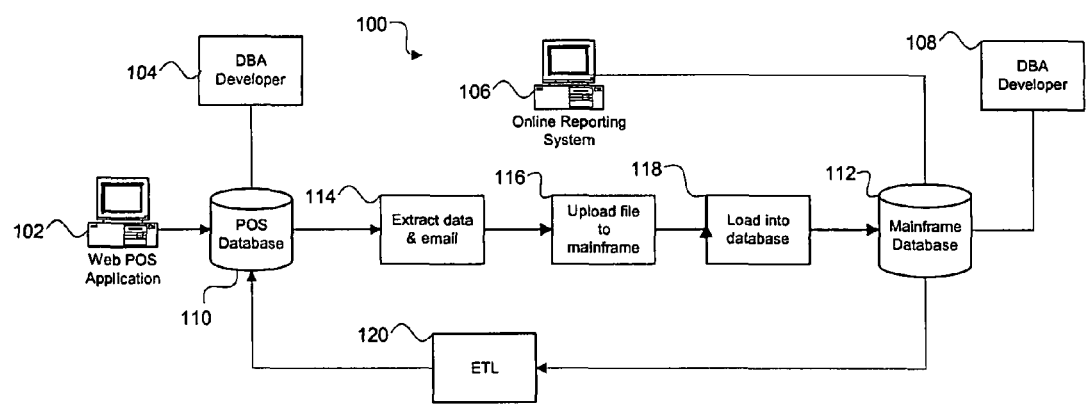
FIG. 1 depicts a sample workflow illustrating the numerous components and communications which can compromise sensitive data.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DESCRIPTION

The present invention overcomes many of the prior art problems associated with transferring sensitive data in a distributed computing network. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. All relative descriptions herein such as upstream, downstream, left, right, up, and down are with reference to the Figures, and not meant in a limiting sense.

For clarity, certain terms are defined generally as follows. A processor generally is logic circuitry that responds to and processes instructions that drive a computer and can include, without limitation, a central processing unit, an arithmetic logic unit, an application specific integrated circuit, a task engine, and/or any combinations, arrangements, or multiples thereof.

Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s).

A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

A network can be a series of network nodes (each node being a digital data processing device, for example) that can be interconnected by network devices and communication lines (e.g., public carrier lines, private lines, satellite lines, etc.) that enable the network nodes to communicate. The transfer of data (e.g., messages) between network nodes can be facilitated by network devices such as routers, switches, multiplexers, bridges, gateways, etc. that can manipulate and/or route data from an originating node to a destination node regardless of any dissimilarities in the network topology (e.g., bus, star, token ring, etc.), spatial distance (local, metropolitan, wide area network, etc.), transmission technology (e.g., TCP/IP, Systems Network Architecture, etc.), data type (e.g., data, voice, video, multimedia, etc.), nature of connection (e.g., switched, non-switched, dial-up, dedicated, virtual, etc.), and/or physical link (e.g., optical fiber, coaxial cable, twisted pair, wireless, etc.) between the originating and destination network nodes.

In view of the challenges discussed herein, a need exists for a system and method that effectively provides protection of sensitive consumer data while allowing access to intermediaries in the e-commerce process.

Still further, organizations need to allow downstream systems to utilize encrypted data. Typically, extract, transform, and load {ETL) tools cannot utilize encrypted data because the data type is not understood and/or the length control is not maintained. Thus, there is a need to preserve and control the data length and type while maintaining high level of security such as in the Advanced Encryption Standard {AES) or Triple Data Encryption Standard {3DES) systems.

In one embodiment, the subject technology balances security and operational needs by employing systems, methods, apparatus and data structures where:

1. A credit card number (and other sensitive fields) are partially encrypted (e.g., using Data Type Preserving encryption or related methods) at the first point of capture (in the commerce chain);

2. The sensitive fields stay partially encrypted (with an optional re-encryption of some fields or parts of the fields content) throughout the commerce chain, enabling most applications to process without any field level decryption; and/or 3. Selected data (at file level and database file level) at rest on disk and backups is additionally and fully (double) encrypted.

This embodiment results in high transparency and low overhead.

It is an object of the subject technology to control the data length and type.

Preferably, data length control (DLC) reduces the need for changes to database and file structures in applications by preserving the length and/or the datatype of the encrypted field. Datatype preservation simply means that each ciphertext field is as valid as the plaintext field it replaces. In one aspect, the method defines an appropriate alphabet of valid characters and performing all operations within the constraints of the defined alphabet. Each different datatype requires a judicious choice of alphabet. An alphabet consisting of numeric digits ("0123456789") could be used to encrypt most number data, such as social security numbers (e.g. 123-45-6789). (The dashes, not included the chosen alphabet, are copied unchanged to the corresponding positions in the ciphertext output.) Other alphabets, such as all printable ASCII characters, all characters shared by ASCII and EBCDIC, or all hexadecimal digits can be used to encode a variety of common datatypes.

As a result of DLC, the following advantages are realized:

DLC reduces the need for changes to database structures and applications by preserving the datatype of the encrypted field; and Each ciphertext field is as valid as the plaintext field it replaces.

It is a further object of the subject technology to provide secure sharing of enterprise information. In business use-cases the invention described minimizes the cost of securing enterprise information and allows for the secure sharing of data within the enterprise and with appropriate individuals outside of the enterprise.

DTP and DLC can be implemented with different methods, including AES Counter Mode, where numeric in/out can be "compressed" to also include meta data within the original length of an alpha-numeric field. It is a further object of the subject technology to monitor user behavior. In business use-cases, the benefits are usage control for enterprise data and validation of usage behavior for critical applications and data.

The flow charts herein illustrate the structure or the logic of the present technology, possibly as embodied in computer program software for execution on a computer, digital processor or microprocessor. Those skilled in the art will appreciate that the flow charts illustrate the structures of the computer program code elements, including logic circuits on an integrated circuit, that function according to the present technology. As such, the present invention is practiced in its essential embodiment(s) by a machine component that renders the program code elements in a form that instructs a digital processing apparatus (e.g., computer) to perform a sequence of function step(s) corresponding to those shown in the flow charts.

Referring now to the FIG. 1, there is shown a block diagram of workflow through an environment 100 that can employ the systems and methods of the subject technology. The subject technology protects sensitive data in such an environment and the infinite variations thereof. The following discussion describes the structure of such an environment 100 but further discussion of the application's program and data modules that embody the methodology of the present invention is described elsewhere herein.

The environment 100 is a client/server network, which can support electronic commerce (e-commerce). The environment 100 includes a plurality of servers which communicate with a distributed computer network via communication channels, whether wired or wireless, as is well known to those of ordinary skill in the pertinent art. In the preferred embodiment, the distributed computer network is the Internet. The servers may be provided by various entities within the environment 100. For simplicity, the servers are not drawn but rather the illustrative components thereof are shown as would be known to those of ordinary skill in the pertinent art. The servers may host multiple Web sites and house multiple databases 110, 112 as necessary for e-commerce and the proper utilization of the subject technology.

A server is any of a number of servers known to those skilled in the art that are intended to be operably connected to a network so as to operably link to a plurality of clients 102, 104, 106, 108 via the distributed computer network. As illustration, the server typically includes a central processing unit including one or more microprocessors such as those manufactured by Intel or AMD, random access memory (RAM), mechanisms and structures for performing I/O operations, a storage medium such as a magnetic hard disk drive(s), and an operating system for execution on the central processing unit. The hard disk drive of the server may be used for storing data, client applications and the like utilized by client applications. The hard disk drive(s) of the server also are typically provided for purposes of booting and storing the operating system, other applications or systems that are to be executed on the server, paging and swapping between the hard disk and the RAM.

The distributed computer network may include any number of network systems well known to those skilled in the art. For example, distributed computer network may be a combination of local area networks (LAN), wide area networks (WAN), or, other network technologies as is well known. For the Internet, the preferred method of accessing information is the World Wide •web because navigation is intuitive and does not require technical knowledge.

The plurality of computers or clients I 02, 104, 106, 108 can be similarly configured as the servers or simple systems such as desktop computers, laptop computers, personal digital assistants, cellular telephones and the like. The clients 102, 104, 106, 108 allow users to conduct e-commerce and administrators to access information on the servers. For simplicity, only four clients 102, 104, 106, 108 are shown. The clients 102, 104, 106, 108 have displays and an input device(s) as would be appreciated by those of ordinary skill in the pertinent art. The display may be any of a number of devices known to those skilled in the art for displaying images responsive to outputs signals from the computers 102, 104, 106, 108. Such devices include but are not limited to cathode ray tubes (CRT), liquid crystal displays (LCDs), plasma screens and the like.

Although a simplified diagram is illustrated in FIG. 1 such illustration shall not be construed as limiting the present invention to the illustrated embodiment.

The client 102 provides consumer access to the environment 100 whereas clients 104, 106, 108 are associated with vendors and/or an entity that provides the goods and/or services sought by the consumer. It will be recognized by those of ordinary skill in the art that the hardware of the clients 102, 104, 106, 108 would often be interchangeable. A plurality of consumers typically can share the same client 102 and cookie technology can be utilized to facilitate access to the environment 100. Of course, a plurality of users can utilize the environment 100 simultaneously.

Similarly to the servers, the clients 102, 104, 106, 108 typically include a central processing unit including one or more micro-processors, mechanisms and structures for performing I/O operations (not shown), a storage medium such as a magnetic hard disk drive(s), a device for reading from and/or writing to removable computer readable media and operating system software for execution on the central processing unit. In one embodiment, the application programs or software reside on the hard disk drive of a client for performing the functions in accordance with the subject technology. In another embodiment, the hard disk drive simply has a browser for accessing a software application hosted on a server within the distributed computing network.

Still referring to FIG. 1, although not shown, a firewall and other conventional security measures may be employed between the client 102 and database 110. To administer these security measures and maintain the POS database 110, the retailer may employ a database administrator (DBA)/software developer.

The client 102 allows a user to browse a Web site hosted by an entity such as a retailer. To make a transaction, the consumer places one or more desired items in an electronic shopping cart and proceeds to check out. At checkout, the consumer is prompted to provide payment information such as credit card information. The credit card company employs a server to store a point of service (POS) database 110 related to all the transactions. In alternative embodiments, a user may utilize an application on the client 102 other than a Web site to make a transaction. Such an application includes software downloaded from the Internet, installed from a diskette, CD, DVD or other persistent storage device, or pre-installed on the client 102.

The records of the POS database 110 must eventually be attended to in terms of payment and passed along to the retailer for storage in a mainframe database 112 stored in a server of the retailer. More particularly, the records are extracted and transferred such as by electronic mail as denoted graphically in area 114. In area 116, a file containing the records is uploaded to the mainframe database 112 while area 118 illustrates that data is loaded into the mainframe database 112 for storage and subsequent access as well. Working in the opposite direction, an extract, transform, and load (ETL) application 120 performs a process in data warehousing that involves extracting data from outside sources; transforming it to fit business needs, and ultimately and loading it into the data warehouse. ETL is the way data gets loaded into the warehouse.

Data may be transferred between the POS database 110 and the mainframe database 112 through a variety of methods. As discussed above, records may be extracted: and emailed to the mainframe 112. Alternatively, data may be transferred through technologies including but not limited to Data Transformation Services, SQL Server™ Transfer Manager and Bulk Copy Program, and SQL Server™ Integration Services, all available as part of Microsoft® SQL Server™; available from Microsoft Corp. of Redmond, Wash.; and Data Integrator™, available from Pervasive Software, Inc. of Austin, Tex.

Figure 2:
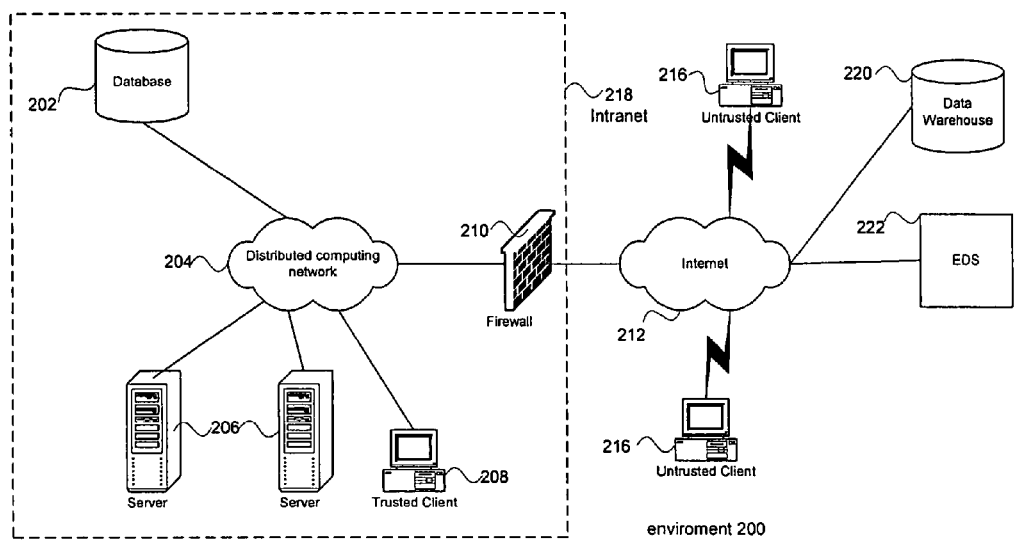
FIG. 2 depicts another environment 200 for implementation of the subject technology.

Referring now to FIG. 2, another more detailed view of an environment 200 for implementation of the subject technology is shown. In brief, the environment 200 has a plurality of clients 208, 216 and servers 206 which access and utilize a plurality of databases 202 to conduct e-commerce. The general operation of FIG. 2 is well-known to one of ordinary skill in the art and, thus, not further described herein for brevity. In general, it will help in understanding of the relationship between applications and data with a Data Flow Diagram.

DTP (Data Type Preservation) and AES Counter Mode encryption are examples of encryption modes and transformation processes that can be used for data confidentiality in the provided examples. Data Type Preservation is described detail in U.S. patent application Ser. No. 09/721,942, filed Nov. 27, 2000, the contents of which are hereby incorporated by reference herein.

Figure 3:
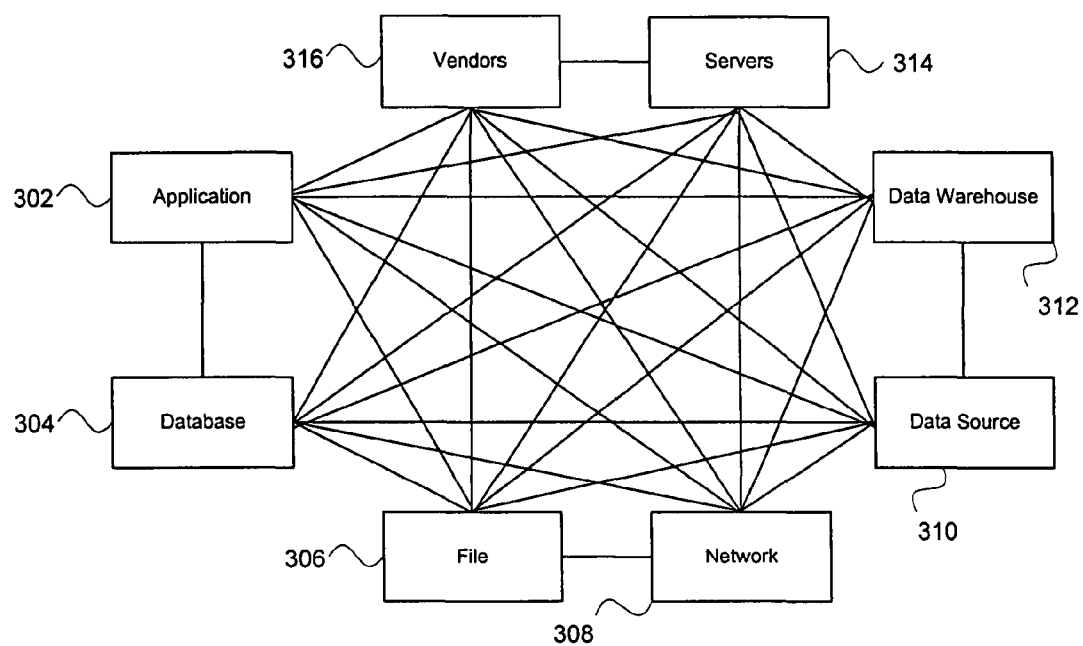
FIG. 3 depicts a complex data flow diagram, representing some of the possible data flows in an enterprise.

A complex data flow diagram, representing some of the possible data flows in an enterprise, is shown in FIG. 3. Numerous components are shown including applications 302, databases 304, files 306, networks 308, data sources 310, data warehouses 312, servers 314 and vendors 316. The connecting lines show that data may flow from any of these components to another component. Data may also flow between two or more of the same type of components.

Figure 4:
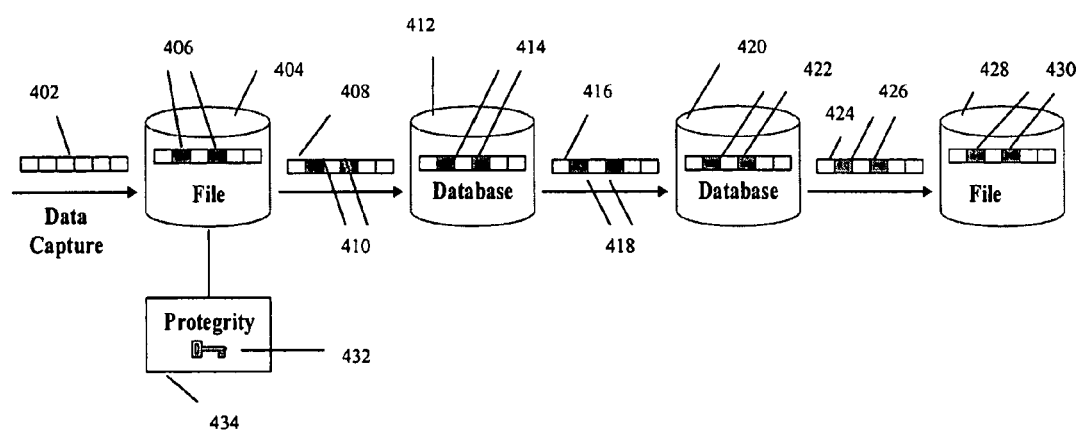
FIG. 4 is a flow diagram illustrating the flow of data under some embodiments of the invention herein.

Referring now to FIG. 4, data 402 is captured. The data 402 may come from any source known now or in the future to one of ordinary skill in the art including but not limited to a web sites, e-commerce applications, electronic data exchange (EDI) and data mining applications. The data 402 is copied to a first file 404 where one or more fields 406 are encrypted with an encryption key 432 which resides in a key repository 434. Alternatively, captured data may be copied directly to a database 412, 420. Data 408 may be copied from the first file 404 to a first database 412. One or more fields 410, 414 remain encrypted while being transferred and once placed on the first database 412. This encryption prevents a breach of security during transfer and eliminates the need to frequently de-encrypt and re-encrypt data. Data 416 may also be transferred from the first database 412 to a second database 420. Again, one or more fields 418, 422 remain encrypted while being transferred and once placed on the second database 420. Data 424 may also be transferred from the second database 420 to a second file 428. Again, one or more fields 426, 430 remain encrypted while being transferred and once placed in the second file 428.

Figure 5:
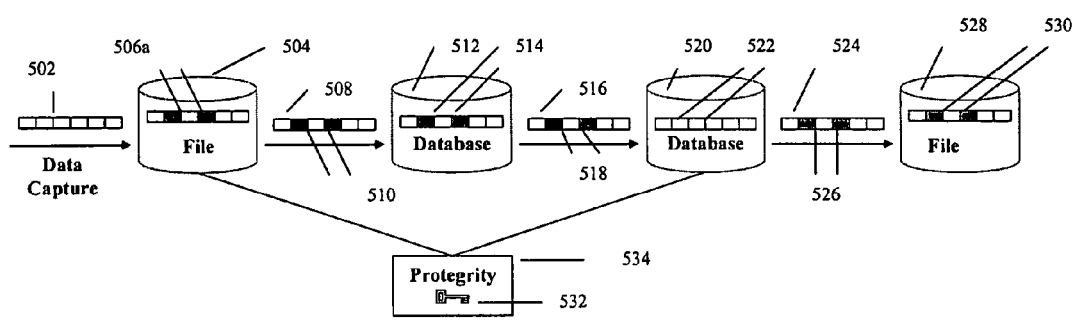
FIG. 5 depicts a data flow in which fields are decrypted in a database.

Referring now to FIG. 5, although selected fields are encrypted at point of data capture and can stay encrypted during the data's life cycle, another method 500 in which the credit card number contained in one or more fields 518, 522 can be decrypted is shown. As will be appreciated by those of ordinary skill in the pertinent art, the following methods and depictions utilize similar principles and structures to the method 400 described above. Accordingly, like reference numerals in subsequent series, such as the "500" series instead of the "400" series, are used to indicate like elements whenever possible. The primary difference of the method 500 in comparison to the method 400 is the key 512 being available to the server storing database 520. As a result, this server is allowed to de-encrypt and access the full credit card number stored in one or more fields 522. Other servers will not need to install or operationally process encryption operations at all.

Referring now to FIG. 5, data 502 is captured. The data 502 may come from any source known now or in the future to one of ordinary skill in the art including but not limited to a web sites, e-commerce applications, electronic data exchange (EDI) and data mining applications. The data 502 is copied to a first file 504 where one or more fields 506 are encrypted with an encryption key 532 which resides in a key repository 534. Alternatively, captured data may be copied directly to a database 512, 520. Data 508 may be copied from the first file 504 to a first database 512. One or more fields 510, 514 remain encrypted while being transferred and once placed on the first database 512. This encryption prevents a breach of security during transfer and eliminates the need to frequently de-encrypt and re-encrypt data. Data 516 may also be transferred from the first database 512 to a second database 520. Again, one or more fields 418 remain encrypted while being transferred to the second database 520. At this point, the one or more fields 522 are de-encrypted using the encryption key 532. Data 524 may also be transferred from the second database 520 to a second file 528. Note that one or more fields 526 of the data 524 is reencrypted for transfer and storage in the second file 530.

Figure 6:
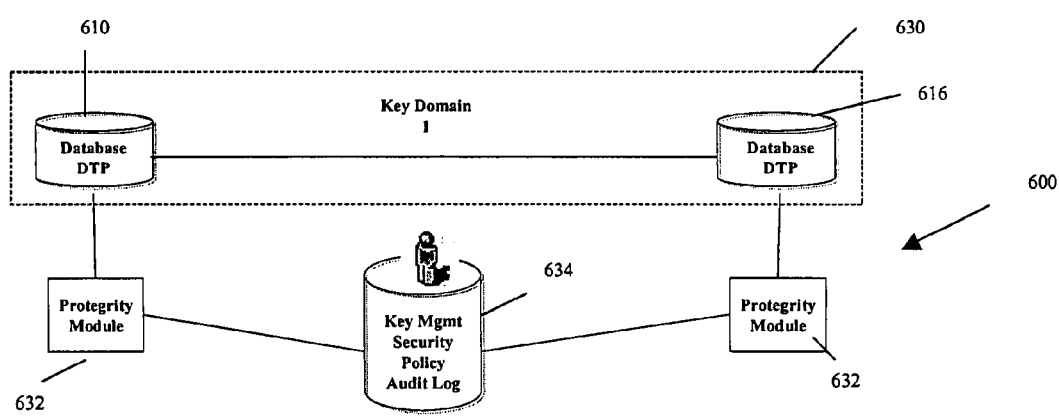
FIG. 6 is a graphical depiction of key management system including a database, a security module, and an audit log.

Referring now to FIG. 6, a graphical depiction of key management is shown and referred to generally by the reference numeral 600. To allow access to the key 412, a domain 530 is created 630. Although only two databases 610, 616 are shown with the domain 630, the number of databases therein is unlimited. To oversee the distribution of the key 412, each database 610, 616 is monitored by a module 632 to coordinate compliance. Each module 632 stores the activity related to key 412 usage and data access in an audit log database 634. As a result, a central key management solution is coordinating the use of encryption keys that are used in a data flow of encrypted data elements that are moving between different databases. Although modules 632 are depicted as "Protegrity" modules, such modules are in no way limited to products (e.g., DEFIANCE™ and Secure.Data™ suites) distributed by Protegrity Corp. of Stamford, Conn.

Figure 7:
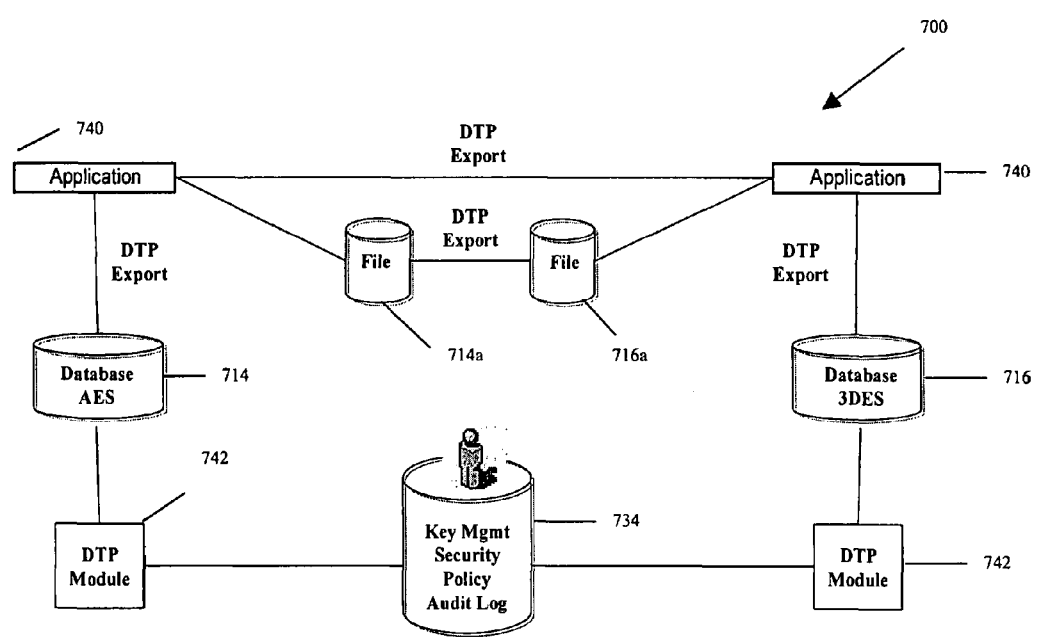
FIG. 7 depicts a scenario where a central key management system coordinates the use of different encryption formats in a data flow between databases and files.

Referring now to FIG. 7, a graphical depiction of another approach to key management is shown and referred to generally by the reference numeral 700. A primary difference is that each respective file in the different database may use a unique encryption method, i.e., AES or Triple DES. AES (Advanced Encryption Standard) is a block cypher adopted as an encryption standard by the United States government. AES is described in Federal Information Processing Standards (FIPS) Publication 197, the contents of which is hereby incorporated by reference herein. Triple DES is an earlier block cypher still used in a variety of applications including electronic payments. Triple DES, its predecessor DES and AES are all described in Andrew S. Tanenbaum, *Computer Networks* 738-45 (4th ed. 2003), the contents of which is hereby incorporated by reference herein.

Again, to oversee the distribution of the key, each file 714a, 716a is stored in database 714, 716, respectively, and monitored by an application 740 as well as a DTP module 742 to coordinate compliance. The activity is stored in an audit log database 734. As a result, a central key management solution with a distributed encryption solution is coordinating the use of different encryption keys and encryption formats in a data flow between databases and files.

Figure 8:
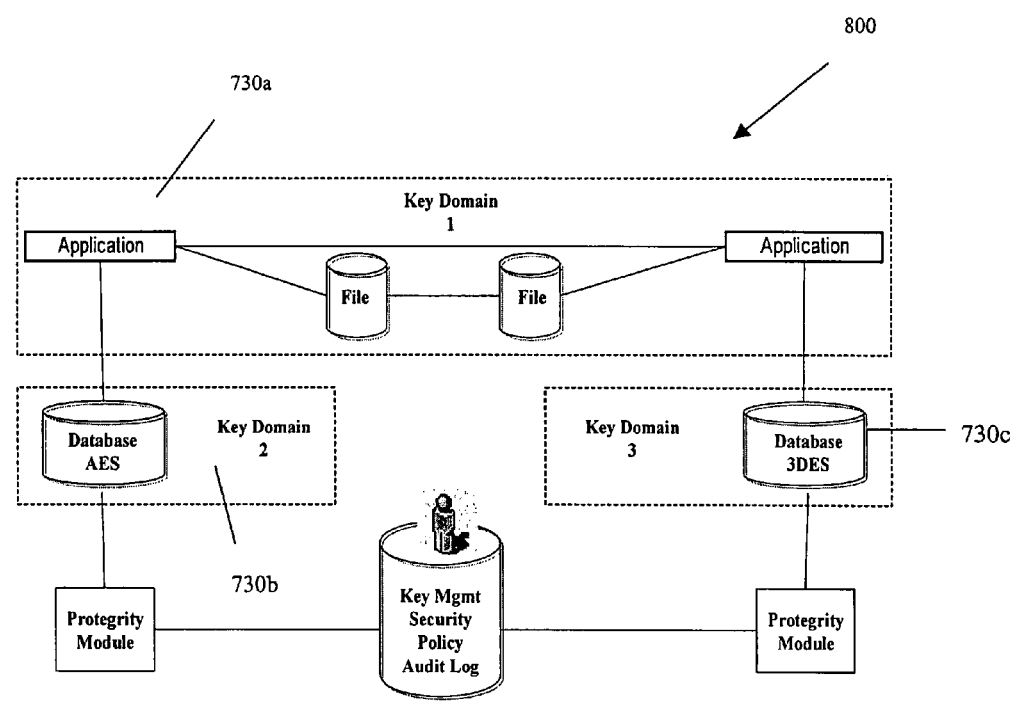
FIG. 8 depicts a scenario where a central key management system coordinates the use of different encryption key domains in a data flow between databases and files.

Referring now to FIG. 8, a graphical depiction of another approach to key management is shown and referred to generally by the reference numeral 800. A primary difference is several key domains 730a-c are created. As a result, a central key management solution is coordinating the use of different encryption key domains in a data flow between databases and files, allowing different policies for managing the key life cycles separately for each domain.

Figure 9:
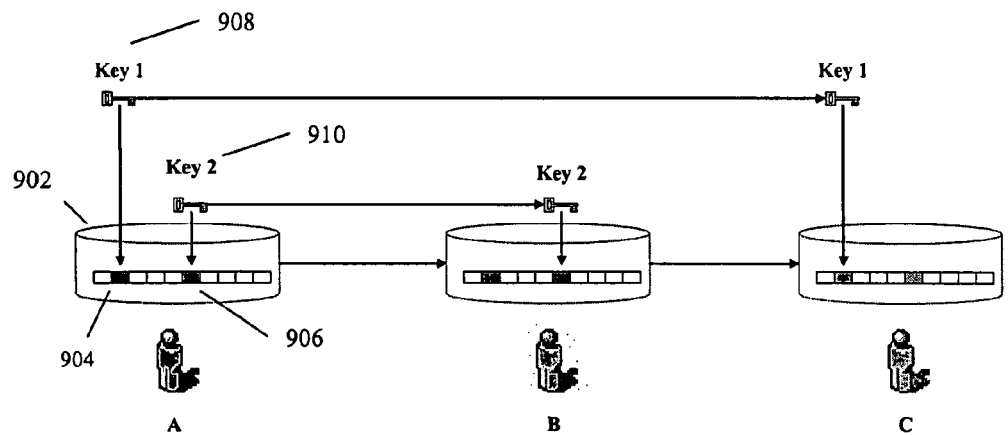
FIGS. 9 and 10 depict how multiple encryption keys may be used to provide selective access to data.
Figure 10:
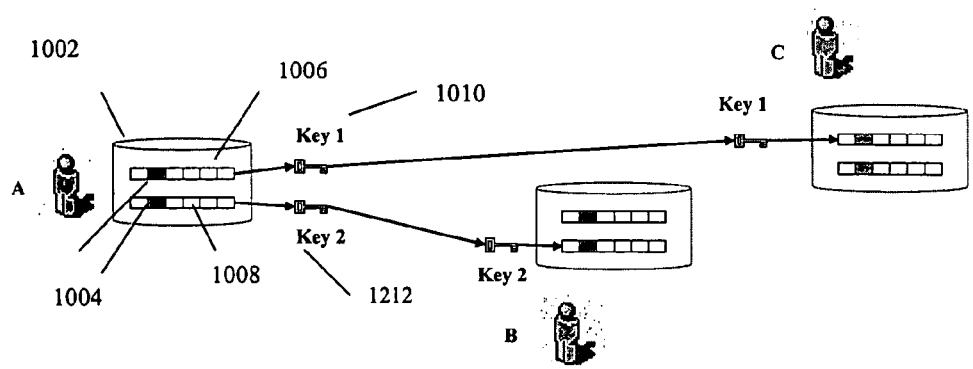

Referring now to FIGS. 9 and 10, two scenarios of how different encryption keys may be given to different parties A, B, C to access different fields are shown. In FIG. 9, party A has full access by virtue of having both keys whereas parties B, C only have access to a single key, respectively, and thus can only access the portions of the credit card number encrypted thereby. The method for exchanging keys is very dependent on the existing infrastructure and what may be added. For instance, to use X.509, it is desirable to have some public key infrastructure (PKI). However, using Diffie-Hellman should for safety also include certificate handling. Having certificates allows the use of SSL. See generally Tanenbaum, *Computer Networks* 768-70, 791-92, the contents of which are incorporated by reference herein.

Referring now in particular to FIG. 9, a schematic represents access to sensitive data for three users A, B, and C. A database 902 exists with two encrypted fields 904, 906. Field 904 is encrypted with Key 1 908 and field 906 is encrypted with a Key 2 910. User A has access to both Key 1 (908) and Key 2 (910). User B only has access to Key 2 (910). User C only has access to Key 1 (908).

Referring now in particular to FIG. 10, a schematic represents access to sensitive data for three users A, B, and C. A database 1002 contains one or more sensitive fields 1004. Separate encryption keys are assigned to sets containing one or more rows 1006, 1008. In a first set of one or more rows containing row 1006, the sensitive field 1004 is encrypted with Key 1 (1010). In a second set of one or more rows containing row 1008, the sensitive field 1004 is encrypted with Key 2 (1012). User A has access to both Key 1 (1010) and Key 2 (1012). User B only has access to Key 2 (1012). User C only has access to Key 1 (1010).

Figure 11:
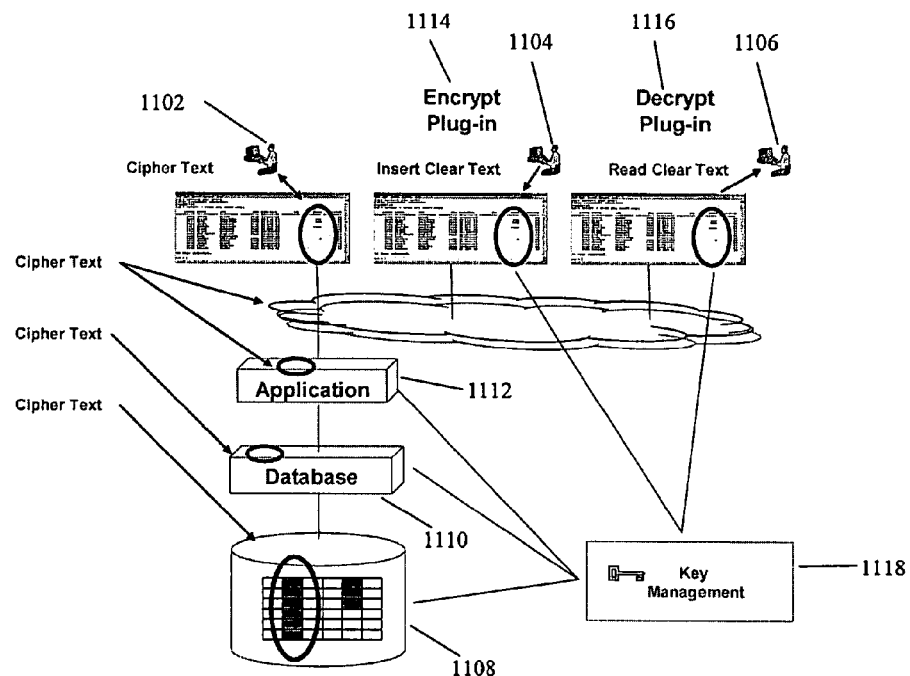
FIG. 11 depicts end to end encryption using DTP for data transmitted between a database and a browser.

FIG. 11 is end to end encryption using DTP for data transmitted between a database and a browser. A plurality of users 1102, 1104, 1106, have varying degrees of access to sensitive data (shaded) 1108 accessed by an application 1112 through a database 1110. Through plug-ins 1114, 1116, in communication with a key management system 1118, users 1104 and 1106 have certain rights to access and/or modify sensitive data 1108. User 1104 may insert data in clear text. User 1106 may read the sensitive data 1108 in clear text. In contrast, user 1102 may only view the sensitive data 1108 in cipher text.

Figure 12:
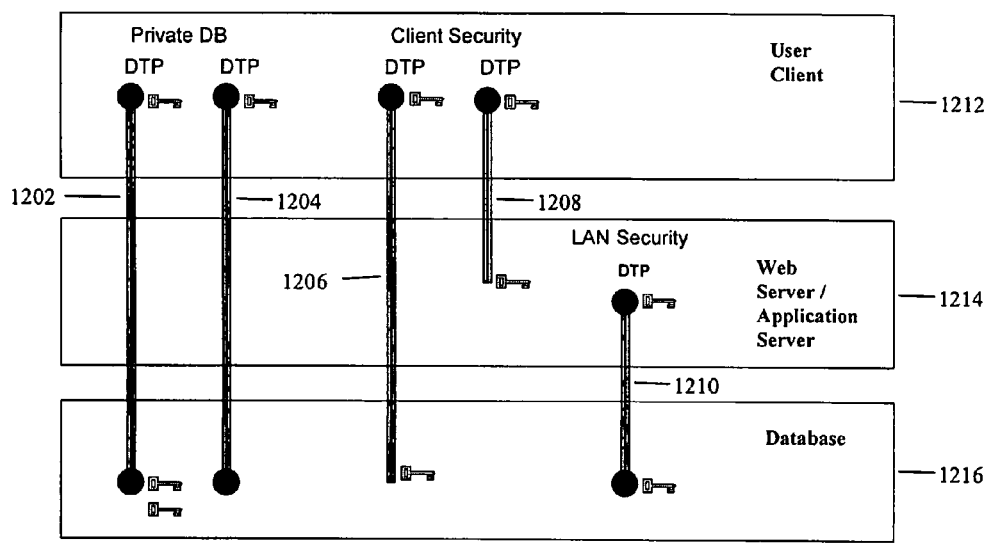
FIG. 12 depicts various examples of how data may be encrypted while in storage and in transit between a client, a server, and a database.

FIG. 12 depicts examples of DTP with different encryption key alternatives for data stored and in transit between a database, web/application server and a user client. These examples of DTP with different encryption key alternatives can provide a solution for a virtual private database, client data security, and LAN encryption. In data flow 1202, data in encrypted by the client 1212 and is encrypted again when stored on the database 1216, resulting in double encryption. In data flow 1204, data is encrypted by the client 1212 and stored as encrypted on the database 1216 (without double encryption). In data flows 1206 and 1208, system communications are encrypted, but not stored on the server 1214 or database 1216, respectively. In data flow 1210, data is encrypted by the server 1214 and reencrypted for storage in the database 1216 (but not necessarily with double encryption).

Figure 13:
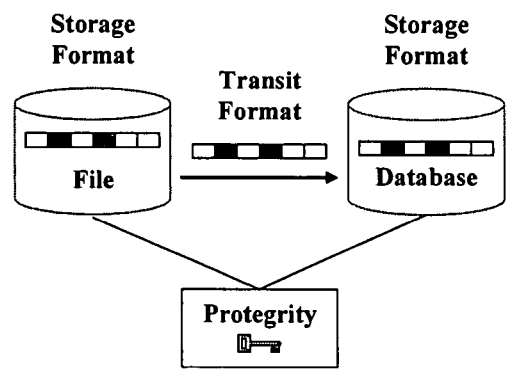
FIG. 13 illustrates examples of format definitions for Data at Rest (Storage Format) and Data in Transit (Transit Format).

FIG. 13 is an example of format definitions for Data at Rest (Storage Format) and Data in Transit (Transit Format). By using the invention herein, organizations can achieve significant performance and security gains by defining a single format such that data remains in the same protected format whether in storage or in transit and therefore need not be reformatted before or after transit.

Figure 14:
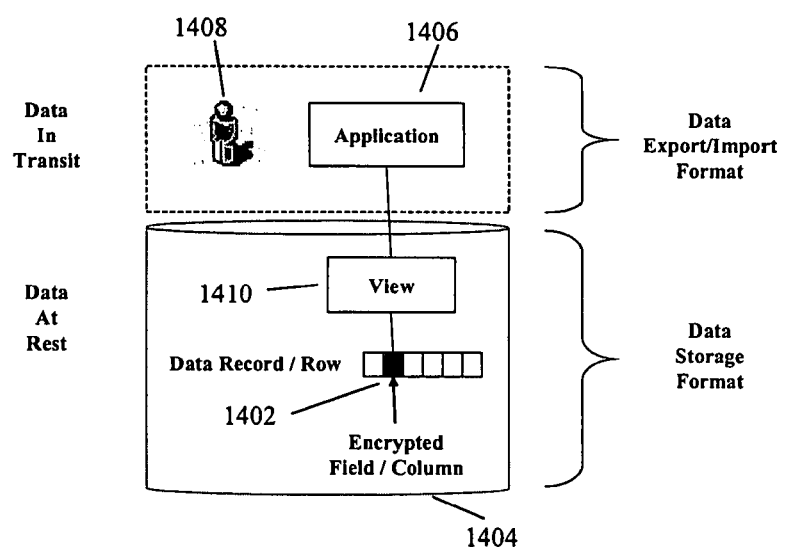
FIG. 14 illustrates additional examples of format definitions for Data at Rest and Data in Transit.

FIG. 14 demonstrates the need for a data export/import format. While data masking (e.g., converting 1234 5678 9009 8765 to 1234 XXXX XXXX 8765) could be used in certain situations, the use of masking presupposes that the masked data will not be sent to another application or database. When this occurs, the data is of little use. Accordingly, by defining an export/import format, data 1402 is protected when sent from a database 1404 to an application 1406. By utilizing an export/import format, a user 1408 may view only a minimal portion of the data 1402 before sending the data 1404 to another application or database (not shown) for further processing. For example, the user 1408 may be a call center employee receiving a customer's order. In this situation, it is likely sufficient for the user 1408 to view only a few digits of the customer's credit card to verify that correct credit card will be charged. After the customer approves the transaction, the data 1404 may be transferred to an application for billing. This application (not shown) will need, and be able deencrypted the data 1404 to obtain the entire credit card number. The data export/import format may be implemented through the use of a view 1410. A view is a read only virtual or logical table composed of the result set of a query.

Figure 15:
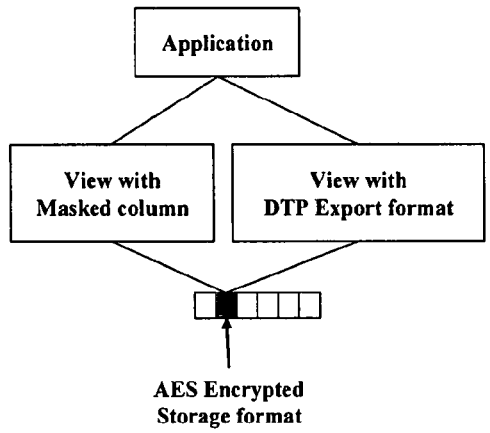
FIGS. 15 and 16 illustrate how an application/user that is not trusted with clear text data may validate masked data and export data in DTP format.

The above description is not intended to deprecate masking techniques. Indeed, masking may be a useful component of a data export/import format. Using the above example, if the middle eight digits of a credit card number encrypted, the data export/import format may specify that application 1406 display the number with masking to prevent confusion as to the actual number. This aspect of the invention is depicted in FIG. 15.

Figure 16:
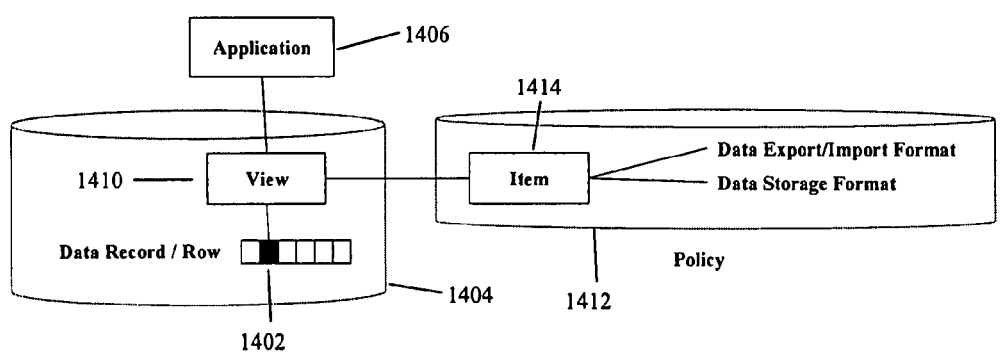

FIG. 16 is an example of application/user accessing a view that is referencing an item with formats defined for data export/import and data storage. As will be appreciated, FIG. 16 is similar to the system presented in FIG. 14, and like number is used accordingly. The difference between FIGS. 14 and 16 is addition of a policy database 1412. The policy database 1412 contains one or more item policies 1414 defining data export/import formats and data storage formats.

Figure 17:
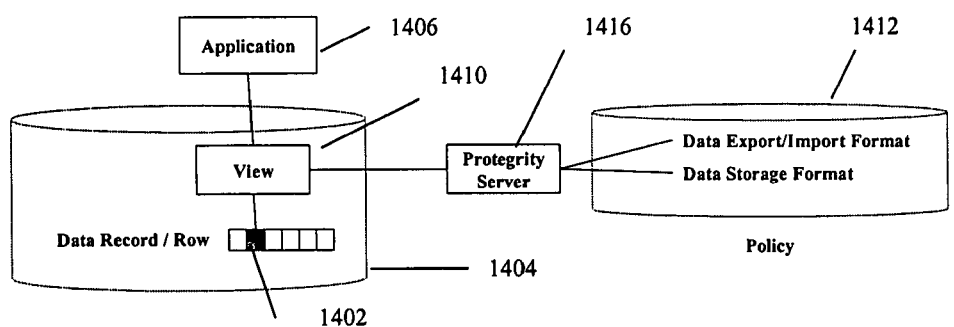
FIG. 17 depicts an example of an application, user and/or view accessing a server that is referencing an item with formats defined for data export/import and data storage.

Referring to FIG. 17, the system depicted in FIG. 16 is further modified to include a module 1416 for coordinating data protection. Although module 1416 is depicted as "Protegrity Server", module 1416 is in no way limited to products (e.g., DEFIANCE™ and Secure.Data™ suites) distributed by Protegrity Corp. of Stamford, Conn. Rather, module 1416 could be any combination of hardware and/or software capable of interacting with policy database 1412 to produce view 1410. Module 1416 may also have additional responsibilities including overall supervision of data security and/or the responsibilities of an access control system as described in U.S. Patent Application 2007/0083928, published Apr. 12, 2007, the contents of which are incorporated by reference.

Figure 18:
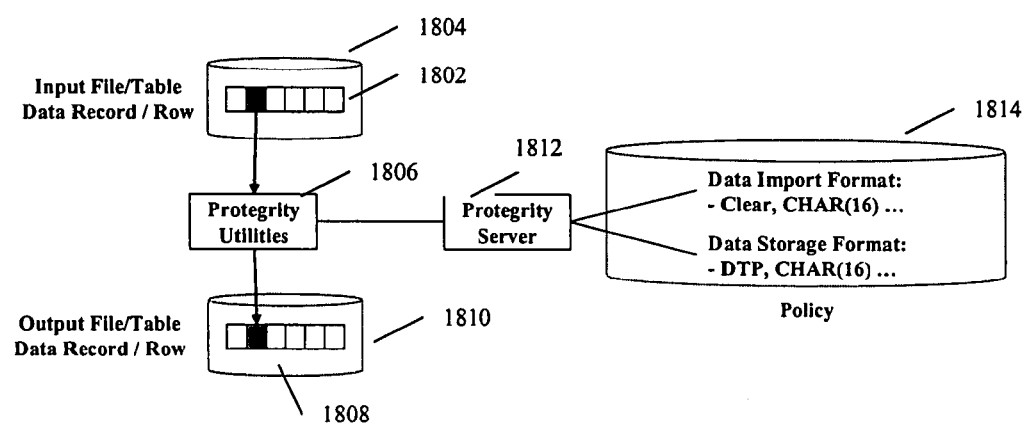
FIG. 18 depicts an example of a PROTEGRITY® Utilities module accessing a PROTEGRITY® server that is referencing an item with formats defined for data import and data storage.

FIG. 18 depicts an embodiment of the invention in which the policy database and module are used for data import and output. A database 1804 containing sensitive data 1802 is import using an module 1806. The module 1806, may be any utility for data import/export including DEFIANCE™ and Secure.Data™, both available from Protegrity Corp. of Stamford, Conn.; Data Transformation Services, SQL Server™ Transfer Manager and Bulk Copy Program, and SQL Server™ Integration Services, all available as part of Microsoft® SQL Server™, available from Microsoft Corp. of Redmond, Wash.; and Data Integrator™, available from Pervasive Software, Inc. of Austin, Tex. Data 1808 (not necessarily the same data as imported above) may be output to database 1810. The module 1806 may utilize another module or server 1812 connected to a policy database 1814 as described herein.

Figure 19:
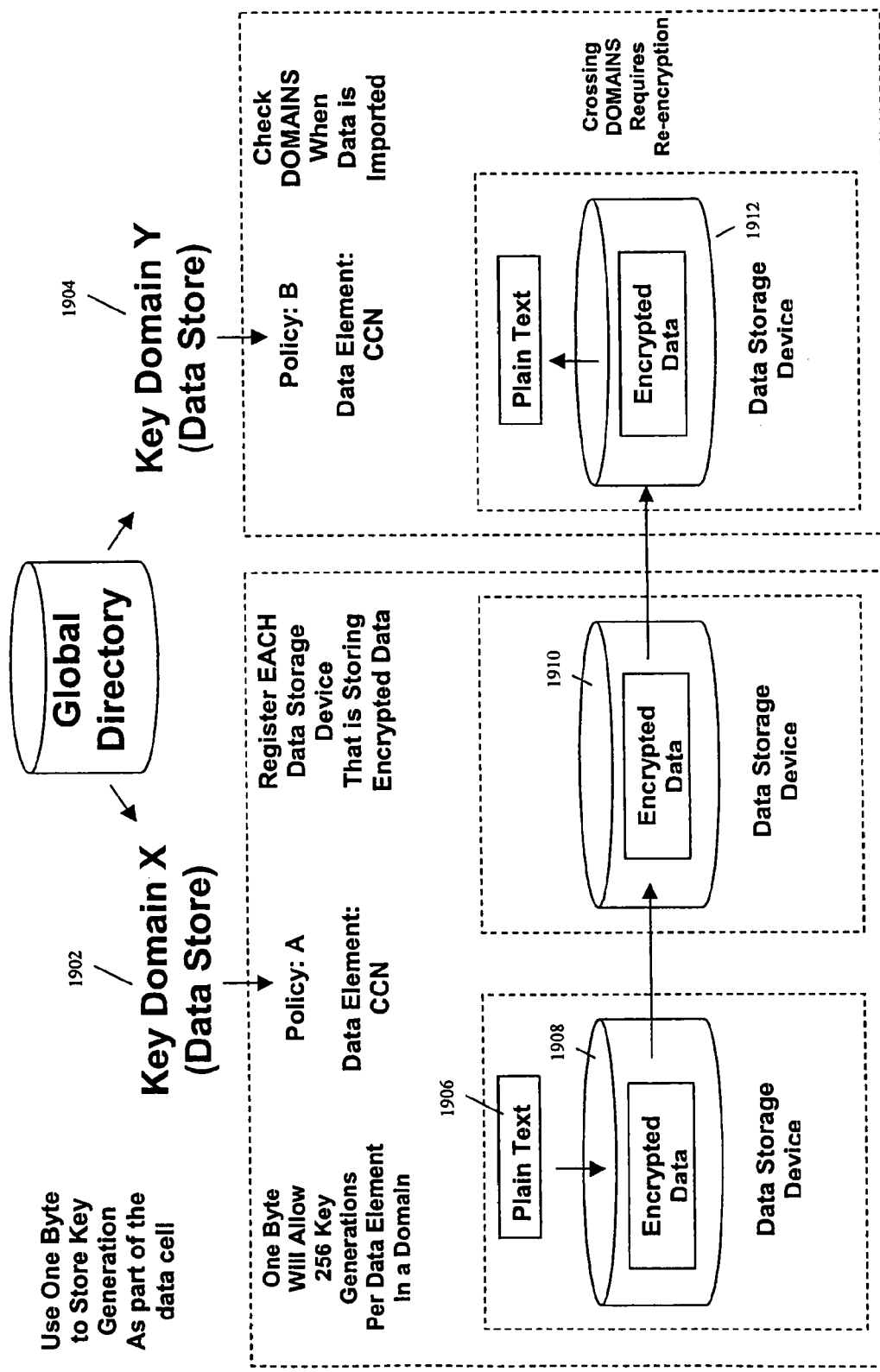
FIG. 19 illustrates re-encryption when crossing domains.

Referring now to FIG. 19, two key domains exist, X 1902 and Y 1904. Plain text data 1906 is entered into database 1908 in key domain X 1902. The data 1906 is encrypted. The data may be transmitted to database 1910 without reencryption because database 1910 is also in key domain X 1902. However, when data 1906 is transferred to database 1912, data 1906 must be reencrypted because database 1912 reside in key domain Y 1904.

Any of the formats discussed including formats for data in transit, data at rest, data import, and data export may be vary based on the user and/or the user's role. Using data export formats for an example, certain individuals and/or roles may be allowed to view clear text credit card data, while other individuals may only view cipher text credit card data.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

While the invention has been described with respect to preferred embodiments, those skilled in the art will readily appreciate that various changes and/or modifications can be made to the invention without departing from the spirit or scope of the invention.

The invention claimed is:

1. A method for data protection comprising:
receiving, at a database system comprising one or more hardware processors, a request for access to unobfuscated data from a requesting entity, the database system associated with a first set of security parameters such that data stored by the database system must be encrypted with a first set of encryption keys, the requesting entity associated with a second set of security parameters such that data stored by the requesting entity must be encrypted with a second set of encryption keys, at least one encryption key in the second set of encryption keys not included within the first set of encryption keys;

in response to the request:
accessing, by the database system, unobfuscated data stored by the database system;
producing, by the database system, obfuscated data by performing a first decryption operation on a first portion of the unobfuscated data using the first set of encryption keys and performing a data masking operation on a second portion of the unobfuscated data, the data masking operation comprising a replacement of each character of the second portion of unobfuscated data with a same masking character;
generating, by the database system, a report comprising the obfuscated data representative of the unobfuscated data; and
providing, by the database system, the generated report to the requesting entity;
receiving, by the database system from the requesting entity, an identification of a portion of the obfuscated data included within the generated report; and
in response to receiving the identification of the portion of the obfuscated data, providing, by the database system, the requesting entity access to a third portion of the unobfuscated data corresponding to the identified portion of the obfuscated data by performing a second decryption operation on the third portion of the obfuscated data using the first set of encryption keys, the requesting entity configured to encrypt the third portion of the unobfuscated data with the second set of encryption keys prior to storing the third portion of the unobfuscated data.

2. The method of claim 1, wherein the obfuscated data is capable of pronunciation by the requesting entity.

3. The method of claim 1, wherein producing obfuscated data further comprises performing a substitution cipher on the unobfuscated data.

4. The method of claim 1, wherein the unobfuscated data and the obfuscated data comprise the same data category.

5. The method of claim 1, wherein the report includes obfuscated data comprising one or more of: names, social security numbers, indications of treatment, and telephone numbers.

6. The method of claim 1, wherein the generated report is encrypted using a first encryption method before providing the report to the requesting entity.

7. The method of claim 6, wherein the requesting entity is configured to encrypt the generated report using a second encryption method before storing the generated report.

8. A system for data protection comprising:
a non-transitory computer-readable storage medium storing executable computer instructions that, when executed, are configured to perform steps comprising:
receiving a request for access to unobfuscated data from a requesting entity, the system associated with a first set of security parameters such that data stored by the system must be encrypted with a first set of encryption keys, the requesting entity associated with a second set of security parameters such that data stored by the requesting entity must be encrypted with a second set of encryption keys, at least one encryption key in the second set of encryption keys not included within the first set of encryption keys;
in response to the request:
accessing unobfuscated data stored by the database system;
producing obfuscated data by performing a first decryption operation on a first portion of the unobfuscated data using the first set of encryption keys and performing a data masking operation on a second portion of the unobfuscated data, the data masking operation comprising a replacement of each character of the second portion of unobfuscated data with a same masking character;
generating a report comprising the obfuscated data representative of the unobfuscated data; and
providing the generated report to the requesting entity;
receiving, from the requesting entity, an identification of a portion of the obfuscated data included within the generated report; and
in response to receiving the identification of the portion of the obfuscated data, provide the requesting entity access to a third portion of the unobfuscated data corresponding to the identified portion of the obfuscated data by performing a second decryption operation on the third portion of the obfuscated data using the first set of encryption keys, the requesting entity configured to encrypt the third portion of the unobfuscated data with the second set of encryption keys prior to storing the third portion of the unobfuscated data; and
a processor configured to execute the computer instructions.

9. The system of claim 8, wherein the obfuscated data is capable of pronunciation by the requesting entity.

10. The system of claim 8, wherein produced obfuscated data further comprises performing a substitution cipher on the request data.

11. The system of claim 8, wherein the unobfuscated data and the obfuscated data comprise the same data category.

12. The system of claim 8, wherein the report includes obfuscated data comprising one or more of: names, social security numbers, indications of treatment, and telephone numbers.

13. The system of claim 8, wherein the generated report is encrypted using a first encryption method before providing the report to the requesting entity.

14. The system of claim 13, wherein the requesting entity is configured to encrypt the generated report using a second encryption method before storing the generated report.

15. A non-transitory computer readable storage medium storing executable computer instructions for data protection, the instructions configured to, when executed by a processor, perform steps comprising:
receiving, at a database system, a request for access to unobfuscated data from a requesting entity, the database system associated with a first set of security parameters such that data stored by the database system must be encrypted with a first set of encryption keys, the requesting entity associated with a second set of security parameters such that data stored by the requesting entity must be encrypted with a second set of encryption keys, at least one encryption key in the second set of encryption keys not included within the first set of encryption keys;
in response to the request:
accessing unobfuscated data stored by the database system;

producing obfuscated data by performing a first decryption operation on a first portion of the unobfuscated data using the first set of encryption keys and performing a data masking operation on a second portion of the unobfuscated data, the data masking operation comprising a replacement of each character of the second portion of unobfuscated data with a same masking character;

generating a report comprising the obfuscated data representative of the unobfuscated data; and providing the generated report to the requesting entity;

receiving, from the requesting entity, an identification of a portion of the obfuscated data included within the generated report; and in response to receiving the identification of the portion of the obfuscated data, provide the requesting entity access to a third portion of the unobfuscated data corresponding to the identified portion of the obfuscated data by performing a second decryption operation on the third portion of the obfuscated data using the first set of encryption keys, the requesting entity configured to encrypt the third portion of the unobfuscated data with the second set of encryption keys prior to storing the third portion of the unobfuscated data.

16. The computer readable storage medium of claim 15, wherein the obfuscated data is capable of pronunciation by the requesting entity.

17. The computer readable storage medium of claim 15, wherein producing the obfuscated data further comprises performing a substitution cipher on the request data.

18. The computer readable storage medium of claim 15, wherein the unobfuscated data and the obfuscated data comprise the same data category.

19. The computer readable storage medium of claim 15, wherein the report includes obfuscated data comprising one or more of: names, social security numbers, indications of treatment, and telephone numbers.

20. The computer readable storage medium of claim 15, wherein the generated report is encrypted using a first encryption method before providing the report to the requesting entity.

21. The computer readable storage medium of claim 20, wherein the requesting entity is configured to encrypt the generated report using a second encryption method before storing the generated report.

* * * * *